US010909016B2

(12) United States Patent
Kobayashi et al.

(10) Patent No.: US 10,909,016 B2
(45) Date of Patent: Feb. 2, 2021

(54) MANAGEMENT COMPUTER AND METHOD OF MANAGING COMPUTER TO BE MANAGED

(71) Applicant: HITACHI, LTD., Tokyo (JP)

(72) Inventors: Emiko Kobayashi, Tokyo (JP); Mineyoshi Masuda, Tokyo (JP)

(73) Assignee: HITACHI, LTD., Tokyo (JP)

( * ) Notice: Subject to any disclaimer, the term of this patent is extended or adjusted under 35 U.S.C. 154(b) by 524 days.

(21) Appl. No.: 15/744,626

(22) PCT Filed: Feb. 3, 2016

(86) PCT No.: PCT/JP2016/053126
§ 371 (c)(1),
(2) Date: Jan. 12, 2018

(87) PCT Pub. No.: WO2017/134758
PCT Pub. Date: Aug. 10, 2017

(65) Prior Publication Data
US 2018/0210803 A1 Jul. 26, 2018

(51) Int. Cl.
G06F 15/177 (2006.01)
G06F 11/07 (2006.01)
(Continued)

(52) U.S. Cl.
CPC ...... *G06F 11/3409* (2013.01); *G06F 11/3006* (2013.01); *G06F 11/3051* (2013.01); *G06F 11/3055* (2013.01); *G06F 11/34* (2013.01)

(58) Field of Classification Search
None
See application file for complete search history.

(56) References Cited

U.S. PATENT DOCUMENTS 10,616,078 B1 * 4/2020 Thomas .............. G06F 9/45558
2010/0205483 A1 * 8/2010 Ishiou ................. G06F 11/0709
714/26

FOREIGN PATENT DOCUMENTS

JP 2001-142746 A 5/2001
JP 2008-191849 A 8/2008
(Continued)

OTHER PUBLICATIONS

Iglesias, F., Zseby, T. Analysis of network traffic features for anomaly detection. Mach Learn 101, 59-84 (2015). https://doi.org/10.1007/s10994-014-5473-9 (Year: 2015).*
(Continued)

*Primary Examiner* — Nicholas R Taylor
*Assistant Examiner* — Ho T Shiu
(74) *Attorney, Agent, or Firm* — Volpe Koenig

(57) ABSTRACT

In a system where resources are used in a varying manner, when performances are monitored based on detected past behavior when the system was operating normally, if performance behavior is detected that is different, it is difficult to determine whether the detected performance behavior results from resources being used differently than when the system was operating normally. According to the present invention, monitoring accuracy is improved by determining whether performance behavior results from change in characteristics relating to the usage of the system by using means for measuring performances when the system is in operation and detecting a performance different from when the system was operating normally, means for measuring characteristics relating to the usage of the system and detecting whether the characteristics are different from when the system was operating normally, and means for comparing performance information with characteristic information relating to the usage of the system.

12 Claims, 12 Drawing Sheets

(51) Int. Cl.
    *G06F 11/34*     (2006.01)
    *G06F 9/455*     (2018.01)
    *G06Q 10/00*     (2012.01)
    *H04L 12/26*     (2006.01)
    *G06F 11/30*     (2006.01)

(56) References Cited

FOREIGN PATENT DOCUMENTS

| | | |
|---|---|---|
| JP | 2010-186310 A | 8/2010 |
| JP | 2012-242985 A | 12/2012 |
| JP | 2014-203310 A | 10/2014 |
| JP | 2015-046133 A | 3/2015 |

OTHER PUBLICATIONS

International Search Report dated Mar. 29, 2016 for the International Application No. PCT/JP2016/053126.

\* cited by examiner

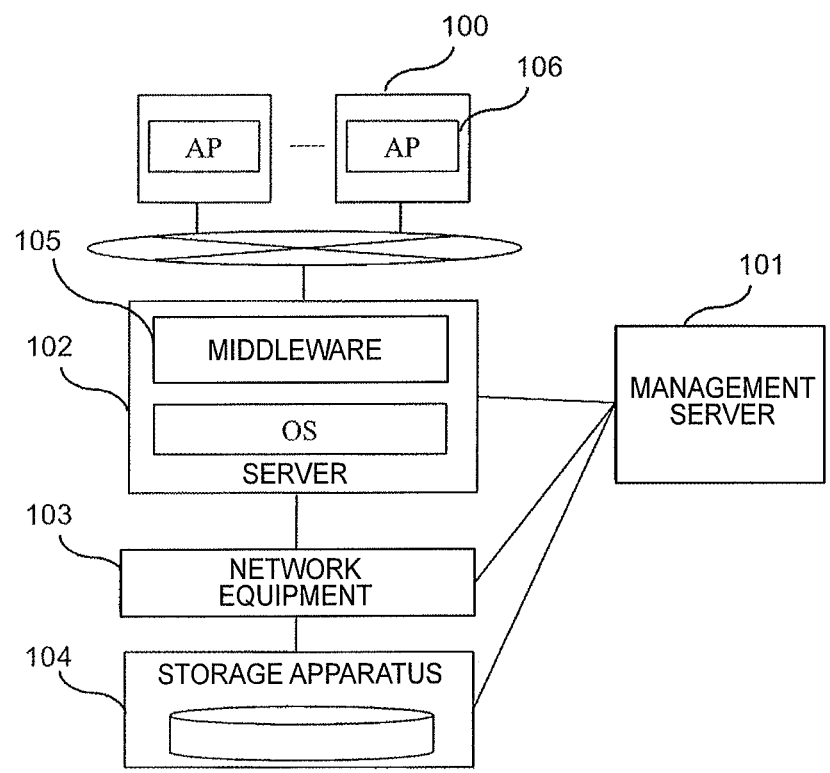
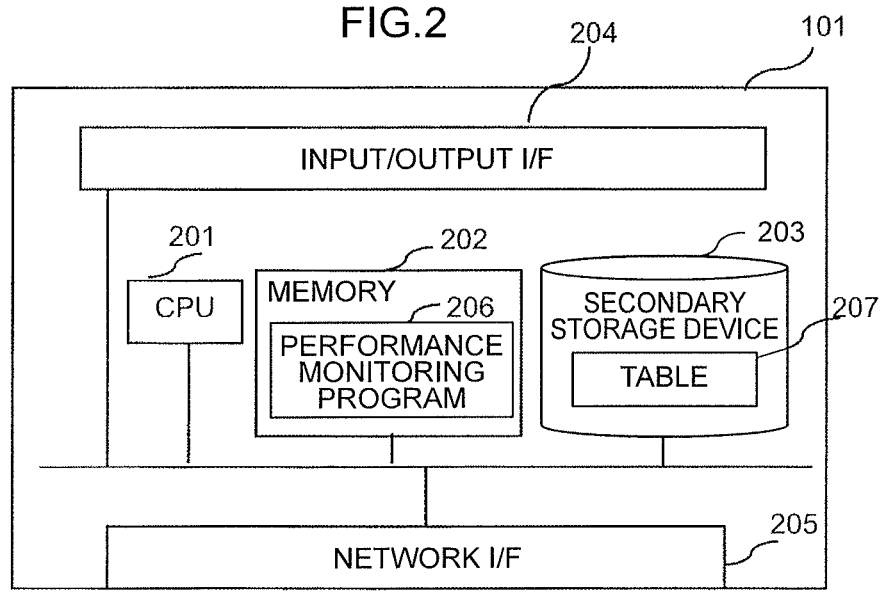

FIG.5

| VECTOR ID (501) | TARGET (502) | MONITORING ITEM (503) |
|---|---|---|
| 1 | SERVER | CPU USAGE RATE |
|   |   | MEMORY USAGE RATE |
| 2 | SERVER | DISK READS |
|   |   | DISK WRITES |
|   |   | DISK PROCESSING STANDBY QUEUE LENGTH |
| 3 | STORAGE APPARATUS | READ RESPONSE TIME |
|   |   | WRITE RESPONSE TIME |
| ... |   |   |

FIG.6

| VECTOR ID (601) | TARGET (602) | MONITORING ITEM (603) |
|---|---|---|
| 1 | DB SERVER | NUMBER OF SESSIONS |
|   |   | NUMBER OF TRANSACTIONS |
| 2 | DB SERVER | NUMBER OF SQL |
|   |   | ... |
| ... |   |   |

(a)

| CLUSTER ID /701 | CENTRAL COORDINATE /702 | | RADIUS /703 |
|---|---|---|---|
| | X-AXIS | Y-AXIS | |
| 1 | Cx1 | Cy1 | d1 |
| 2 | Cx2 | Cy2 | d2 |
| 3 | Cx3 | Cy3 | d3 |
| ... | | | |

| TIME | FOR MONITORING USAGE CHARACTERISTIC | | | FOR MONITORING OPERATION PERFORMANCE | | |
|---|---|---|---|---|---|---|
| | NUMBER OF TRANS- ACTIONS | NUMBER OF SESSIONS | ANOMALY RATE | CPU USAGE RATE | MEMORY USAGE RATE | ANOMALY RATE |
| T1 | x11 | y11 | a1 | x21 | y21 | a21 |
| T2 | x12 | y12 | a2 | x22 | y22 | a22 |
| T3 | x13 | y13 | a3 | x23 | y23 | a23 |
| ... | | | | | | |

| TARGET | STATUS | TYPE | MESSAGE |
|---|---|---|---|
| SERVER | WARNING | WARNING | RESOURCE xxx IS ABNORMAL. PLEASE INVESTIGATE THE CAUSE. |
| | CAUTION REQUIRED | CAUTION | yyy RELATED TO AP USE IS CHANGING. PERFORMANCE OF RESOURCE xxx IS ABNORMAL. PLEASE REVIEW RESOURCE ALLOCATION. |
| | CAUTION (MINIMAL RISK) | INFORMATION | yyy RELATED TO AP USE IS CHANGING. RESOURCES ARE NOT AFFECTED. |
| | NORMAL | null | null |
| | | | |

MANAGEMENT COMPUTER AND METHOD OF MANAGING COMPUTER TO BE MANAGED

TECHNICAL FIELD

The present invention relates to a management computer and a management method for monitoring the operational status of a system.

BACKGROUND ART

In operating and managing a system, in order to prevent the user from being affected as a result of the processing capacity of the system deteriorating during its operation, it is necessary to monitor the processing status of the system (this is hereinafter referred to as the "operation performance") and thereby promptly detect any abnormality in the operation performance and take proper measures in advance. As indexes for perceiving the operation performance, there are, for instance, resource usage, throughput, and response time.

Here, the term "resource" refers to the resources required for the system to perform processing, and includes servers, storage apparatuses and network equipment configuring the system as well as the CPU, memory, input/output device, secondary storage device and the like of such apparatuses and equipment. As a method of monitoring the operation performance of a system, conventionally used was a method of using the measurement data of a performance index when the system was operating normally as a reference and, when the performance index differs from the behavior of the system when it was operating normally, detecting such difference as an abnormality.

As a method of creating a reference from the measurement data of a performance index when the system was operating normally, a method of creating a time-series reference regarding the monitoring items of a single performance index is described in [PTL 1]. Moreover, a method of creating a reference by combining the monitoring items of a plurality of performance indexes and classifying the monitoring items based on the vector positions of measurement data is described in [PTL 2].

CITATION LIST

Patent Literature

PTL 1: Japanese Patent Application Publication No. 2001-142746
PTL 2: Japanese Patent Application Publication No. 2012-242985

SUMMARY OF THE INVENTION

Problems to be Solved by the Invention

When providing a system to a user in a cloud environment, there are cases where the usage of the resources by the system, such as the behavior of the applications used by the resources of the system (this is hereinafter referred to as the "usage characteristic"), will change. The operation performance of the system resources may vary due to problems with the system resources themselves without any change in the usage characteristic, and may also vary due to changes in the usage characteristic without any problems with the system resources themselves. And the proper measures to be taken will differ depending on whether the variation in the operation performance was caused by problems with the system resources themselves or caused by changes in the usage characteristic. Nevertheless, with the foregoing conventional technologies, because no consideration is given to changes in the usage characteristic, when an abnormality is detected as a result of the measurement value related to the performance index during the operation of the resources falling outside a range that is not included in the data at the time that the reference was created, the administrator is required to foremost analyze whether the abnormality is an abnormality in the operation performance caused by problems with the system itself or an abnormality in the operation performance caused by changes in the usage characteristic. Consequently, there is a problem in that the workload required until proper measures can be taken will increase, and prompt measures cannot be taken.

An object of the present invention is to alleviate the administrator's workload required for the investigation of causes and the implementation of measures by performing proper evaluation which gives consideration to changes in the usage of system resources (usage characteristic) upon monitoring the operation performance.

Means to Solve the Problems

A management computer includes a processor and manages a first computer to be managed which is accessed from a first application program. The processor acquires a first operation performance as a value related to a resource performance of the first computer to be managed and a first usage characteristic as a value related to access from the first application program to the first computer to be managed, calculates an anomaly rate of the first operation performance and an anomaly rate of the first usage characteristic, and notifies an operational status of the first computer to be managed based on the calculated anomaly rate of the first operation performance and the calculated anomaly rate of the first usage characteristic.

Advantageous Effects of the Invention

According to the present invention, it is possible to alleviate the administrator's burden in investigating the cause and promptly determine the proper measures to be taken by properly evaluating whether the usage of resources (usage characteristic) was the cause of the variation upon monitoring the operation performance.

BRIEF DESCRIPTION OF DRAWINGS

FIG. 1 is a diagram showing a concept of the system in embodiment 1 of the present invention.
FIG. 2 is a diagram showing a hardware configuration of the management server in embodiment 1 of the present invention.
FIG. 5 is a diagram showing a table configuration of the operation performance monitoring item management table for managing the monitoring items related to the operation performance in embodiment 1 of the present invention.

FIG. 6 is a diagram showing a table configuration of the usage characteristic monitoring item management table for managing the monitoring items related to the usage characteristic in embodiment 1 of the present invention.

FIG. 9 is a diagram showing a table configuration of the monitoring data management table for managing the data to be monitored in chronological order in embodiment 1 of the present invention.

DESCRIPTION OF EMBODIMENTS

First Embodiment

Figure 3:
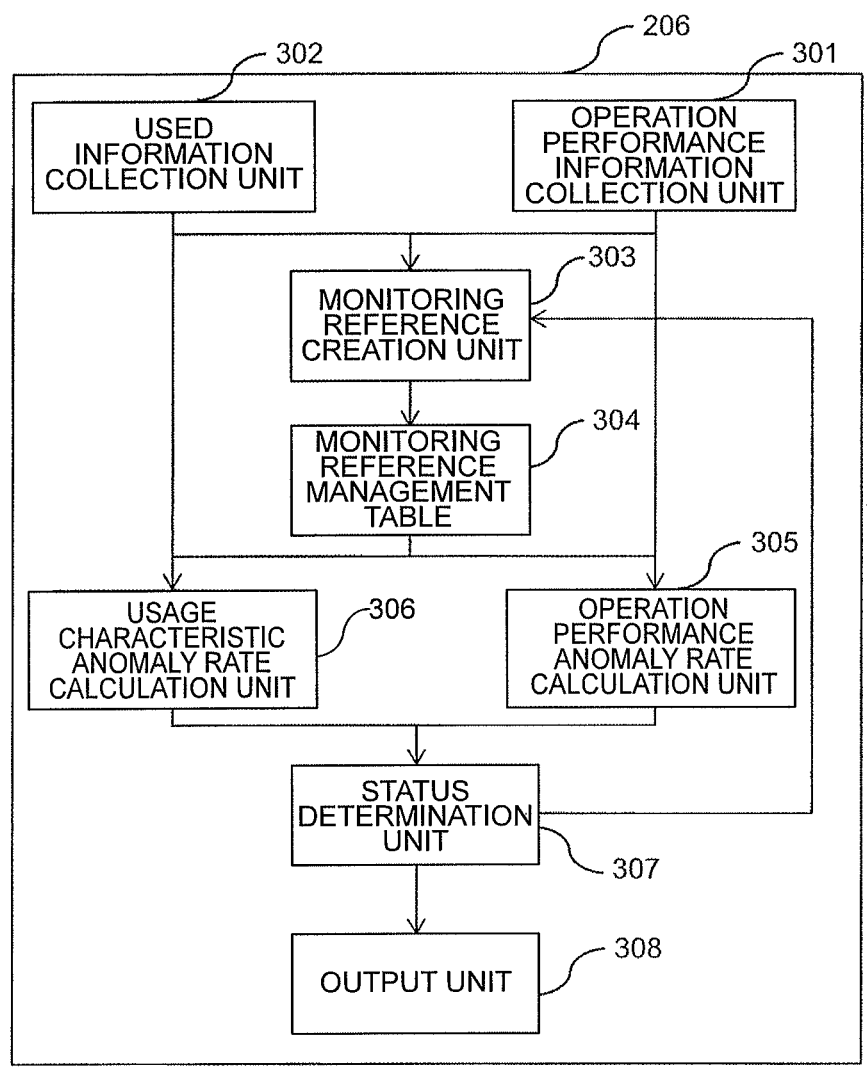
FIG. 3 is a diagram showing a configuration of the functional module of the performance monitoring program in embodiment 1 of the present invention.

FIG. 1 is a conceptual diagram of a computer system to which the present invention is applied. This computer system is configured from one or more user computers 100, one or more servers 102, one or more network equipment 103, one or more storage apparatuses 104, and a management server 101 for managing the system. An application program 106 is running on the one or more user computers 100, and the one or more servers are each connected to a network. Furthermore, while the server 102 and the storage apparatus 104 are connected via the network equipment 103 in FIG. 1, they may also be connected directly. The management server 101 is connected to the respective devices via a management network (not shown). Running on the server is, for example, middleware 105 such as a database (DB) execution platform (this is hereinafter referred to as the "DB server") or an application execution platform, and the application program 106 accesses the middleware via the internet or a local network. The application program may also run on the same server as the middleware.

FIG. 2 is a diagram showing a hardware configuration of the management server 101. The management server 101 is configured from one or more central processing units (CPUs) 201, a memory 202, a secondary storage device 203 such as a hard disk, an input/output interface 204 which controls the input information from a keyboard or a mouse and the output information to a display, and a network interface 205 to be connected to the network. The hardware configuration of the other servers 102 is also the same. Note that the server and the management server may also be virtual servers.

A performance monitoring program 206 is loaded in the memory 202 of the management server 101, and executed by the CPU 201. Moreover, the secondary storage device 203 stores data of a table 207 to be used by the performance monitoring program. In the application server 102, an application program is loaded in the memory, and executed by the CPU.

Note that each server may also be mounted as a virtual machine rather than as a physical machine.

FIG. 3 is a diagram showing a functional module configuration of the performance monitoring program. The performance monitoring program is configured from an operation performance information collection unit 301 which collects information such as the resource usage as the performance index of servers, storage apparatuses and other devices during their operation, a used information collection unit 302 which collects information related to the access to the middleware running on the server, a monitoring reference creation unit 303 which creates a monitoring reference by using the information collected during a given period of time when the system was operating normally, a monitoring reference management table 304 which manages the created monitoring reference, an operation performance anomaly rate calculation unit 305 which calculates an anomaly rate by comparing the periodic measurement data of the operation performance information with the reference, a usage characteristic anomaly rate calculation unit 306 which calculates an anomaly rate by comparing the periodic measurement data of the used information with the reference, a status determination unit 307 which evaluates the status based on the calculated anomaly rates, and an output unit 308 which outputs the determination result.

Figure 4:
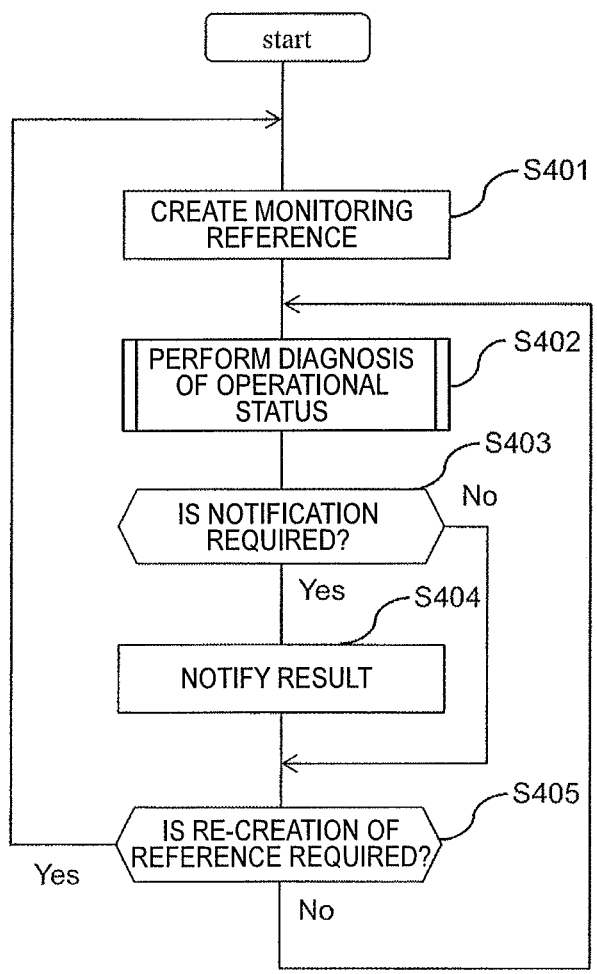
FIG. 4 is a diagram showing a flowchart of the performance monitoring program in embodiment 1 of the present invention.

FIG. 4 is a flowchart of the performance monitoring program in this embodiment, and shows the processing flow of this embodiment. Each step is executed by the central processing unit (CPU) 201. In monitoring reference creation step S401, a monitoring reference is created with regard to information of the operation performance and information of the usage characteristic which were collected for a given period of time. The monitoring reference of the operation performance is created based on the operation performance monitoring item management table shown in FIG. 5 and the monitoring reference of the usage characteristic is created based on the usage characteristic monitoring item management table shown in FIG. 6, respectively. Thus, the operation performance monitoring item management table 500 of FIG. 5 and the usage characteristic monitoring item management table 600 of FIG. 6 are foremost explained.

FIG. 5 is a diagram showing a configuration of the operation performance monitoring item management table. The operation performance monitoring item management table is configured from a vector ID field 501 for managing vectors in which a plurality of monitoring items are combined, a target field 502 which indicates the type of device or software from which information is to be collected, and a monitoring item field 503 which indicates the name of the item to be monitored. The monitoring items are items for which information is to be periodically collected from target devices such as servers, middleware running on the servers, storage apparatuses, network equipment and software, and the vectors manage the monitoring items by combining one or more monitoring items. Each monitoring item is a value related to the resource performance of the device to be monitored, and indicates to what extent the resources of the device to be monitored are currently exhibiting their processing capacity. In the example of FIG. 5, the vector having an vector ID of 1 manages the CPU usage rate and the memory usage rate as the monitoring items with the server as the target device from which information is to be collected. The combination of the vector ID 501 may be defined in the system in advance, or set by the user using the management server by adding or deleting monitoring items, and the combination of the vector ID 501 shown in FIG. 5 is merely an example.

FIG. 6 is a diagram showing a configuration of the usage characteristic monitoring item management table. The usage characteristic monitoring item management table is configured from a vector ID field 601 for managing vectors in which a plurality of monitoring items are combined, a target field 602 which indicates the type of device or software from which information is to be collected, and a monitoring item field 603. In the example of FIG. 6, the vector having a vector ID of 1 manages the number of sessions and the number of transactions as the monitoring items with the server as the target device from which information is to be collected. Each monitoring item is a value related to the access from the application program running on the user's computer to the server. The monitoring items may be defined in the system in advance, or set by the user using the management server by adding or deleting monitoring items, and are managed as one vector. The combination of the vector ID 601 shown in FIG. 6 is merely an example.

Returning to the explanation of the creation of a reference in monitoring reference creation step S401 of FIG. 4, information is collected for a given period of time regarding the monitoring items in the monitoring item field 503 of the operation performance monitoring item management table of FIG. 5. The given period of time may be fixed in advance in the system, or set by the administrator using the management server. Data of the respective monitoring items are deemed to be the data of the same time when the monitoring time is the same or they are within the monitoring time error, and represented as multi-dimensional vector values centered around the respective monitoring items.

When the monitoring time error is set to be less than 1 minute, for instance, data x1 at 10:00:00 of the CPU usage rate and data y1 at 10:00:10 of the memory usage rate of the monitoring item field 503 are used as the data (x1, y1) of one vector. The data of a given period of time represented as the vector values are classified into one or more groups. As the classification method, adopted may be the K-means method of classifying approximate values into a plurality of circles (in the case of two dimensions; a plurality of spheres for three or more dimensions), and extracting the central coordinate and the radius of the groups. The groups in this example are referred to as clusters. The classification result is stored in the monitoring reference management table of FIG. 7(a). The monitoring reference management table will be described later.

Furthermore, the monitoring items to be managed using the usage characteristic monitoring item management table of FIG. 6 are also subject to the same collection and classification of information.

Subsequently, an operational status diagnosis is performed using the created monitoring reference (S402). The operation diagnosis processing will be explained later with reference to the detailed flow of FIG. 8.

After the operation diagnosis processing, whether or not notification is required is evaluated based on the obtained result (S403). In the foregoing evaluation, a notification is given when there is an abnormal status in the determination result of each vector based on the results of the measurement data of a certain point in time (S404). Otherwise, a notification may also be given when an abnormal status continues for n-times or more based on the results of the measurement data for a plurality of (m) times in the past. The frequency m, n is defined in the system or designated by the user.

While the operation diagnosis processing is performed each time the measurement data is collected, the operation diagnosis processing of a given period of time may also be collectively performed. In the foregoing case, the evaluation of whether or not notification is required may also be a method where the determination results of data for a given period of time for each vector are consolidated, and only the notification of the most common type is output.

Furthermore, whether or not the monitoring reference needs to be recreated is determined (S405). When the anomaly rate of the usage characteristic data is equal to or greater than the threshold, whether or not the anomaly rate of the usage characteristic data for a plurality of (m) times in the past is equal to or greater than n-number of times and equal to or greater than the threshold is determined. When the anomaly rate of the usage characteristic data for a plurality of (m) times in the past is equal to or greater than n-number of times and equal to or greater than the threshold, it is determined that the recreation of the monitoring reference is required, and the monitoring reference of the operation performance and the monitoring reference of the usage characteristic are created once again.

Figure 7:
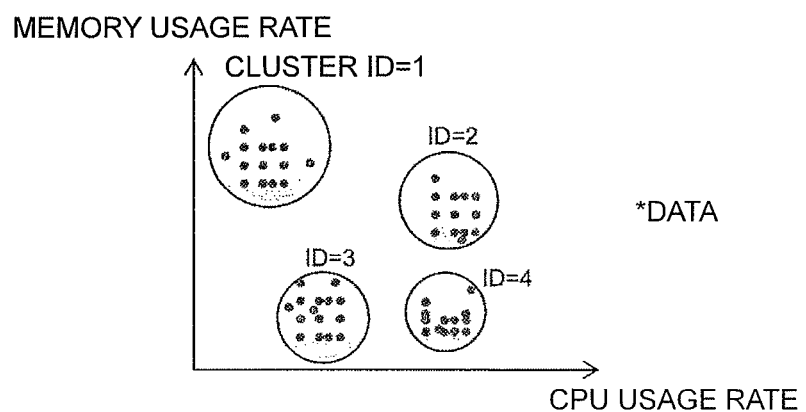
FIG. 7 is a diagram showing a scheme for managing the reference data in embodiment 1 of the present invention.

FIG. 7 shows a scheme for managing the clusters as the created monitoring references. FIG. 7(a) is a diagram showing a configuration of the monitoring reference management table for managing the created monitoring references. The monitoring reference management table is configured from a cluster ID field 701 for identifying the clusters extracted in the monitoring reference creation processing, a central coordinate field 702 which manages, for each cluster, the vector of the central coordinates based on the numerical values for each axis configuring the vector, and a radius field 703 which manages the radius of the circle of the clusters (spheres for three or more dimensions). While FIG. 7 shows an example of a two-dimensional vector based on two monitoring items, the axis field of the central coordinates is set to match the number of dimensions for three or more dimensions. FIG. 7(b) is a diagram of an example indicating the clusters of references created from the two monitoring items of the CPU usage rate and the memory usage rate on a two-dimensional graph. Here, four clusters are created and an ID is assigned to each cluster.

Figure 8:
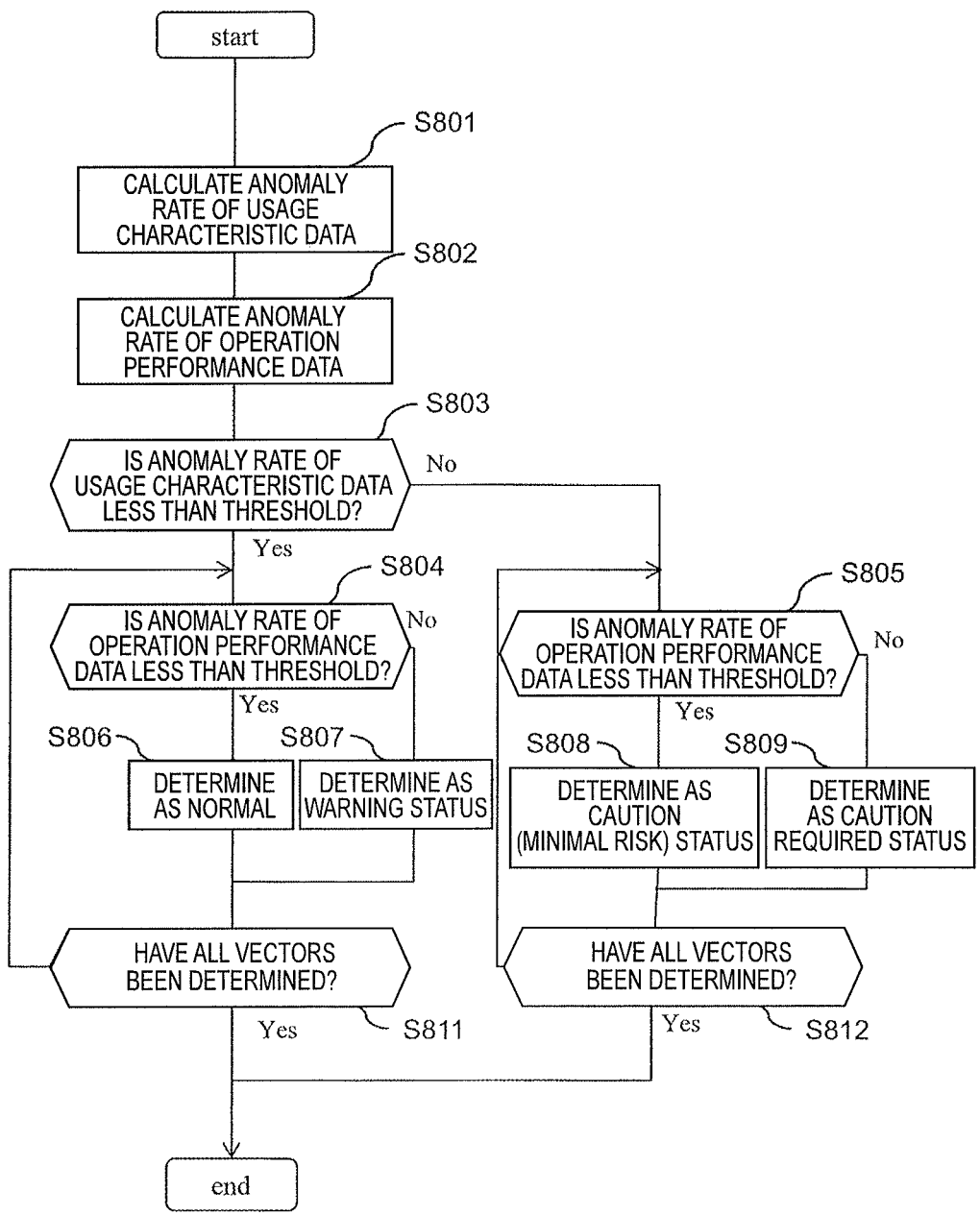
FIG. 8 is a diagram showing a flowchart of the operational status diagnosis processing of the performance monitoring program in embodiment 1 of the present invention.

FIG. 8 is a flowchart showing the flow of the operational status diagnosis processing. Each step is executed by the central processing unit (CPU) 201. The measured usage characteristic data is compared with the monitoring reference to calculate a numerical value showing the deviation level from the monitoring reference (this numerical value is hereinafter referred to as the "anomaly rate") (S801). Here, the anomaly rate is calculated by identifying the cluster in which the distance between the measurement data and the central coordinates is the closest, normalizing the radius of the identified cluster as 1, and calculating the anomaly rate based on the distance between the measurement data and the central coordinates. The anomaly rate increases as the measurement data deviates farther from the cluster.

The management server manages the threshold of the anomaly rate as the evaluation reference for notifying the user. The threshold may be the same value as the operation performance monitoring vector and the usage characteristic monitoring vector, or a different value. The threshold may be defined in the system in advance, or set by a user.

Next, an anomaly rate is similarly calculated regarding the operation performance monitoring vector based on the measurement data for each vector (S802).

In FIG. 8, the anomaly rate of the usage characteristic data is foremost compared with the threshold (S803), and the anomaly rate of the operation performance data is subsequently compared with the threshold (S804, S805). The status is consequently determined (S806 to S809). Here, the operational status of the resources is defined based on the following conditions.

Normal status: When the usage characteristic is less than the threshold and the operation performance is less than the threshold Warning status: When the usage characteristic is less than the threshold and the operation performance is equal to or greater than the threshold Caution required status: When the usage characteristic is equal to or greater than the threshold and the operation performance is equal to or greater than the threshold Caution (minimal risk) status: When the usage characteristic is equal to or greater than the threshold and the operation performance is less than the threshold This determination of status based on the comparison with the threshold is repeated for all vectors to be used for monitoring the operation performance (S810, S811).

FIG. 9 is a diagram showing a configuration of the monitoring data management table which manages the measurement data of the monitoring items. The measurement data and the calculated anomaly rates are managed, for each time, regarding the usage characteristic vector and the respective vectors to be used for monitoring the operation performance. As the measurement data relative to the time, the data within the monitoring time error shall be deemed the data at such time. For example, when the monitoring time error is set to be less than ±30 seconds, the measurement data of 10:00 will be the data having the monitoring time of 09:59:31 to 10:00:30.

Figure 10:
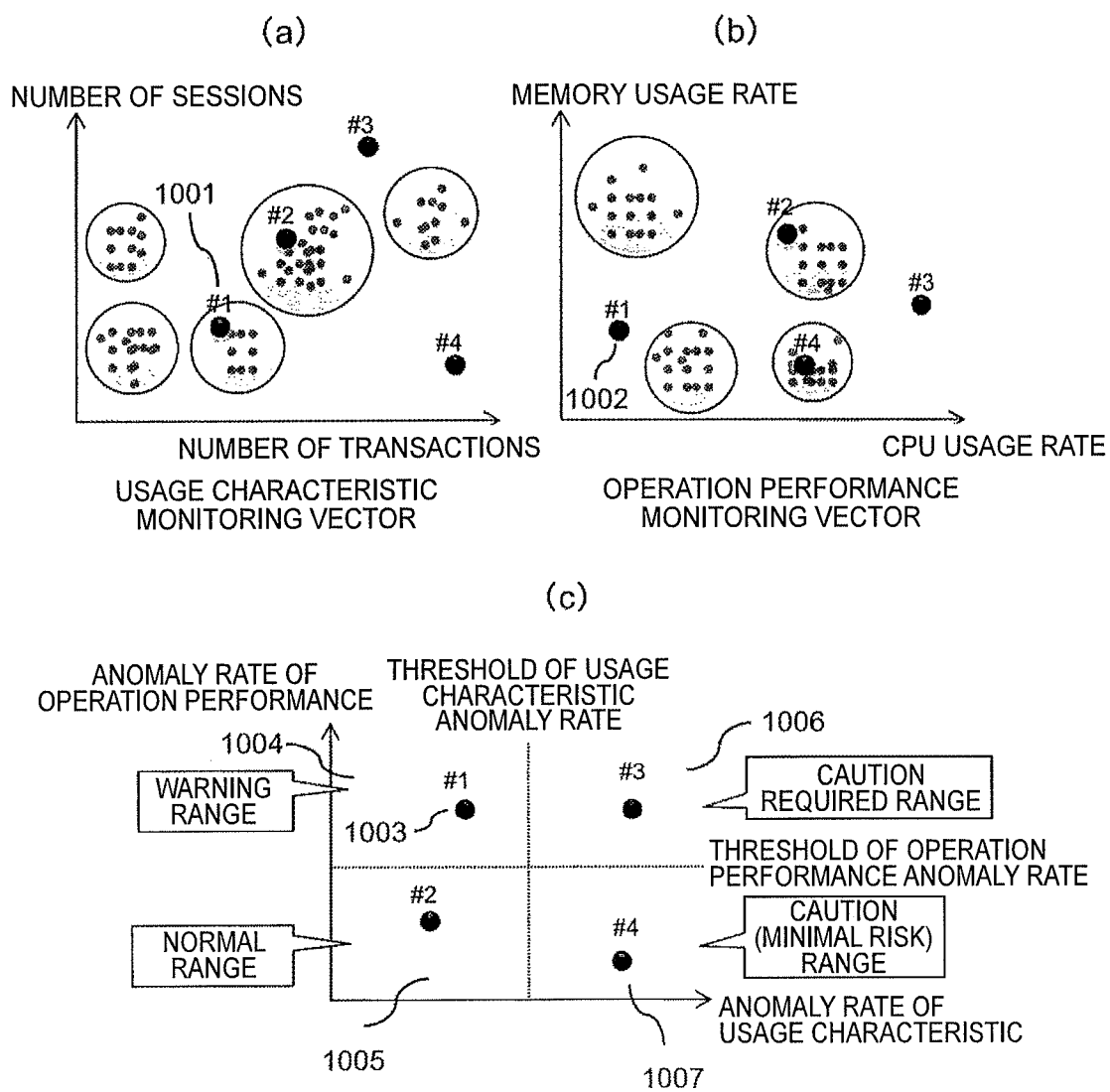
FIG. 10 is a diagram showing a scheme of the evaluation method in embodiment 1 of the present invention.

FIG. 10 is a diagram showing a scheme of the operational status diagnosis. FIG. 10(a) is a diagram showing an example of the usage characteristic monitoring vector. As the monitoring items, the number of transactions indicating the use of the DB server is used as the x-axis, and the number of sessions indicating the use of the DB server is used as the y-axis. Each circle indicates a cluster as the monitoring reference. FIG. 10(b) is a diagram showing an example of the operation performance monitoring vector. As the monitoring items, the CPU usage rate is used as the x-axis, and the memory usage rate is used as the y-axis. The black circle above each vector represents the measurement data. Each black circle of #1 to #4 indicates that it is the data of the same time. For example, when the measurement data at time T1 is set as #1 from the data managed in FIG. 9, in FIG. 10(a), the data (1001) of #1 is within the circle of the cluster because the anomaly rate is a1 and less than the threshold.

In FIG. 10(b), the data (1002) of #1 is outside the circle of the cluster because the anomaly rate is a11 and equal to or greater than the threshold. FIG. 10(c) is a graph in which the anomaly rate of the usage characteristic and the anomaly rate of the operation performance are represented as the x-axis and the y-axis. Because the anomaly rate (a1, a11) at time T1 is plotted at the position of the data 1003 and this position falls within the warning range 1004, the status is evaluated as a warning status. When the data of #2 to #4 are also similarly plotted based on the anomaly rate, they will respectively fall within the ranges of normal 1005, caution required 1006, and caution (minimal risk) 1007, and evaluated as being the respective statuses.

Figures 11, 12:
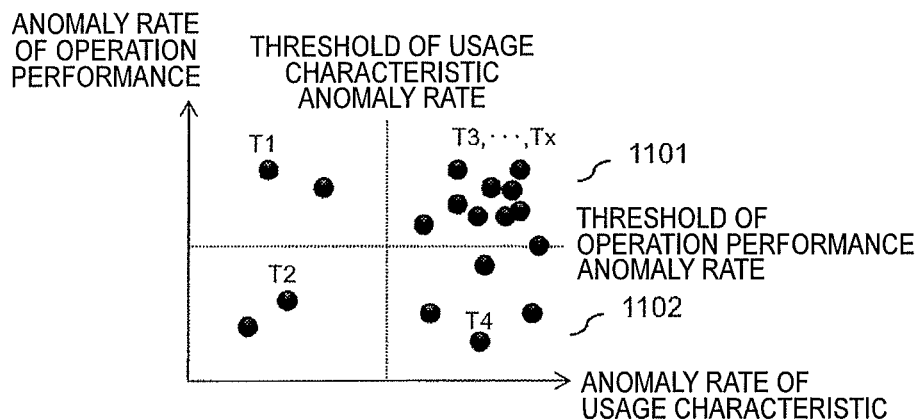
FIG. 11 is a diagram showing a scheme of the evaluation method using data of a given period in embodiment 1 of the present invention.
FIG. 12 is a diagram showing a table configuration of the notification management table for managing the notification contents according to the determination result in embodiment 1 of the present invention.

FIG. 11 is a diagram showing an example of the results of monitoring data for a given period of time regarding a certain operation performance vector.

When data of a given period of time is used in the determination (S403) regarding whether or not notification is required in the flowchart of FIG. 4, the number of data evaluated as being a normal status, a warning status, a caution required status, or a caution (minimal risk) status among the data of a given period of time is measured, and the status with the greatest number of data is notified. For example, when the number of data falling within the range (1101) where the anomaly rate is equal to or greater than the threshold is the greatest as shown in FIG. 11, the status is determined as being the caution required status and notification is thereby output.

Moreover, in the determination (S405) regarding whether or not the recreation of the reference is required, when there is data of a certain ratio or higher in the range (1101 and 1102) where the anomaly rate of the usage characteristic is equal to or greater than the threshold in FIG. 11, it is determined that the recreation of the reference of the operation performance and the reference of the usage characteristic is required. When it is determined that recreation is required, the reference of the operation performance and the reference of the usage performance are recreated, and the reference of the operation performance and the reference of the usage characteristic recreated by the management server 101 are stored in the secondary storage device 203. Specifically, the monitoring reference management table of FIG. 7(a) is updated.

FIG. 12 is a diagram showing a table for managing the notification content to be output according to the status. This table is configured from a target field 1201 which indicates the resources to be monitored, a status field 1202, a type field 1203 indicating a message type corresponding to the status, and a message field 1204 which manages the content of the message. In this example, a normal status is managed without any message (null), and no message is output. The monitoring items of the target vector and the target device may also be included in the message.

Figure 13:
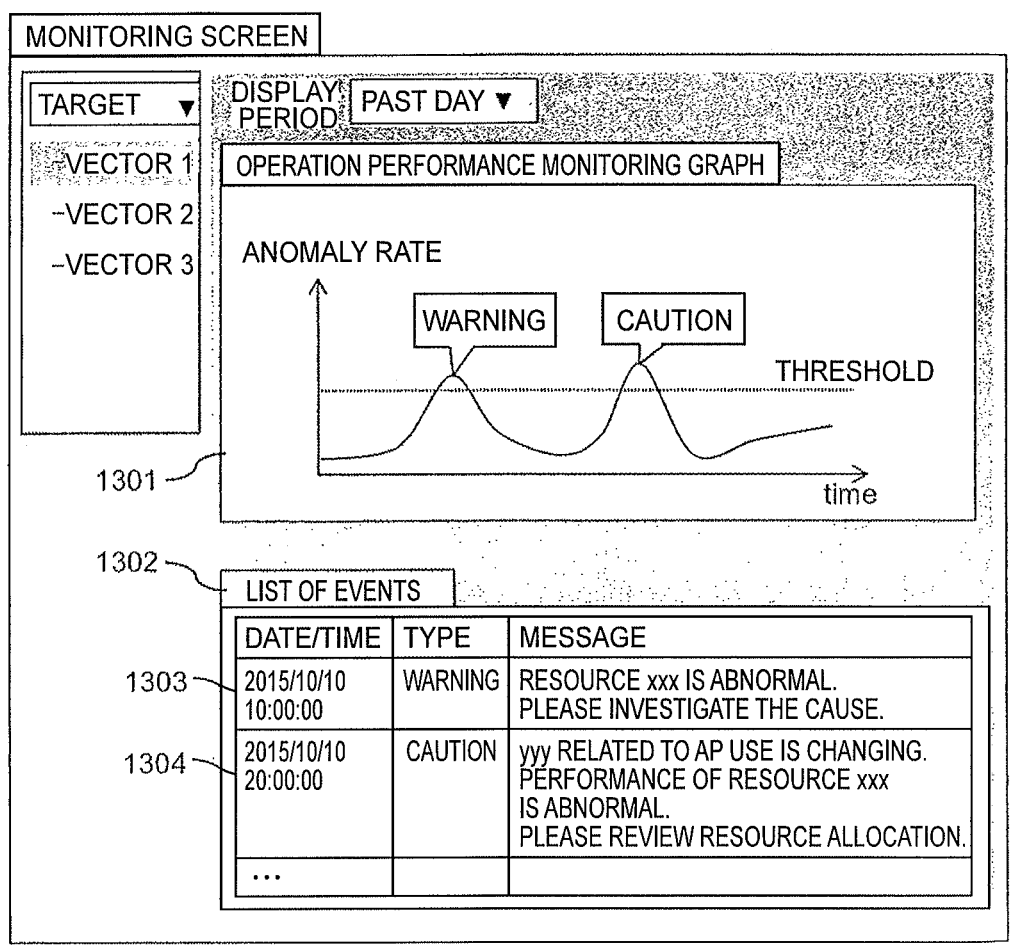
FIG. 13 is a diagram showing an example of the output screen in embodiment 1 of the present invention.

FIG. 13 is a diagram showing an example of the output screen in this embodiment. The upper row (1301) displays, in a time series, the anomaly rate of the operation performance monitoring vector to be monitored, and the lower row (1302) displays the output notification as an event list. The event list may also display, in addition to the type of notification, a message proposing the proper measure to be taken. In the graph of the upper row, even when the operation performance is exceeding the threshold, two different types of notifications; specifically, warning (1303) and caution (1304), are displayed. Based on the notifications displayed as described above, the administrator can differentiate the proper measures to be taken depending on the different notifications, and thereby promptly take measures.

Moreover, depending on the administrator, there may be cases where, for instance, he/she wishes to preferentially take measures against the notification of warning (1303) among the numerous notifications. Thus, the configuration may also be such that the output screen shown in FIG. 13 accepts the selection of the notification types that the administrator wishes to be notified of, and only displays the notifications of the selected notification types. Consequently, by only displaying the notifications which are currently required by the administrator in cases where numerous notifications are given, it is possible to improve the administrator's management efficiency. FIG. 13 merely shows an example of the output screen, and, for example, the screen of FIG. 11 may also be output.

According to the configuration described above, it is possible to differentiate the notifications by properly evaluating, upon monitoring resources, whether or not the cause is the variation in the characteristics of using the resources, and alleviate the administrator's burden in performing isolation processing.

As one specific example, considered is a case where a DB server is provided to the user's application program based on PaaS (Platform as a Service) in a cloud environment. Upon monitoring the provided system, when it is detected that the CPU usage rate of the server to execute the DB server is different from normal, for instance, a case where the CPU usage increased due to an inappropriate execution plan in the DB server is an abnormality in the DB server; that is, an abnormality of the resource itself, but a case where the number of transactions is greater than normal is an increase in the CPU usage pursuant to increased input; that is, a change in the use of resources (usage characteristic). Because conventional technologies are unable to differentiate the foregoing cases, the administrator was required to foremost analyze which case caused the abnormality, and was unable to promptly take proper measures.

Nevertheless, according to the present invention, when a variation in the CPU usage rate is detected and a notification is given, because different notifications are given depending on whether or not there was a variation in the number of transactions, the administrator can promptly take proper measures in response to the notification.

Second Embodiment

As a modified example of embodiment 1 of the present invention, illustrated is an embodiment of a configuration in which the middleware used by the application program is distributed to a plurality of servers. While embodiment 1 included one device for monitoring the operational status, and used one vector to monitor the usage characteristic by the application program, this embodiment differs with respect to the point that multiple devices and middleware are used to monitor the operational status.

Figure 14:
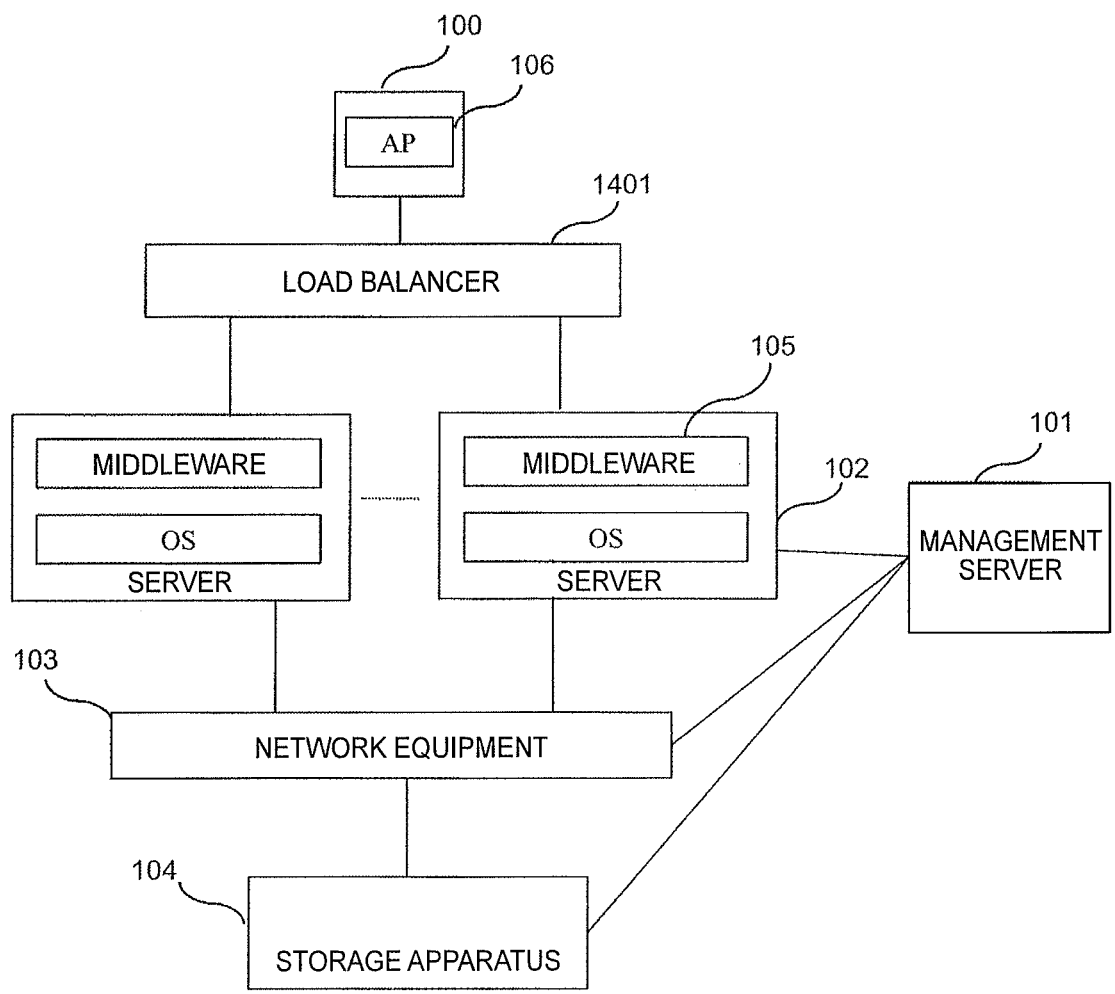
FIG. 14 is a diagram showing an overview of the system in embodiment 2 of the present invention.

FIG. 14 is a diagram showing an overview of the system to which embodiment 2 of the present invention is applied. The same middleware is running on a plurality of servers, and the application program and the server are connected to a load balancer 1401. Access from the application program is processed by the load balancer and distributed to the middleware of a plurality of servers. Distribution to the middleware of a plurality of servers may be executed by the user computer 106 or the server 102 which is loaded with load balancing software, or by a device which is loaded with load balancing software that is separate from the user computer 106 and the server 102.

Here, as with embodiment 1, the middleware is explained by taking the DB server as an example. The DB server shares data with the storage apparatus in a configuration of performing load balancing processing among a plurality of servers.

In this embodiment, the usage characteristic of the application program is acquired from the OS of each server as the access destination and from the DB server. Furthermore, a value obtained by adding the measurement data of the monitoring items related to the used information acquired from the respective server at the same time is calculated. Data in which the monitoring time falls within a certain range of error is deemed to be the measurement data of the same time.

As the usage characteristic monitoring vector, provided are a vector for monitoring each of the plurality of DB servers, and a vector for monitoring the total value. In the monitoring data management table shown in FIG. 9, usage characteristic monitoring columns (in the example of FIG. 9, number of transactions, number of sessions, anomaly rate) are provided for each server. Furthermore, in the respective columns of number of transactions and number of sessions, columns for managing the total value of all servers having the load balancing configuration and the anomaly rate in the total value are provided.

With regard to the operation performance, as with embodiment 1, information is collected from the server, the storage apparatus and the like, and an operation performance monitoring vector is provided for each device and monitored.

The measurement data addition processing is performed in the monitoring reference creation processing (S401) and the operation diagnosis processing (S402) of the flowchart of FIG. 4.

With regard to the monitoring reference, created are a reference for each DB server which is distributed as a usage characteristic monitoring reference, and a reference for each application program as the total value which is a consolidation of all distributions to the DB servers.

With regard to the operation diagnosis processing shown in the flowchart of FIG. 8, the anomaly rate of the usage characteristic of each server and the anomaly rate of the total value of the usage characteristic of each server are calculated in step (S801) of calculating the anomaly rate from the usage characteristic data. The anomaly rate of the usage characteristic of each server is calculated from the usage characteristic of each server and the reference of each DB server, and the anomaly rate of the total value of the usage characteristic of each server is calculated from the total value of the usage characteristic of each server and the reference of each application program.

The calculation method is the same as embodiment 1. When comparing the anomaly rate of the usage characteristic and the anomaly rate of the operation performance of the server, in the step of comparing the anomaly rates to determinate the status, the evaluation is performed, in the same manner as embodiment 1, by foremost comparing the anomaly rate of the usage characteristic of each server and the anomaly rate of each operation performance. In other words, in step (S801) of FIG. 8, the anomaly rate of the usage characteristic of each server is calculated from the usage characteristic of each server and the reference of each DB server. Subsequently, in step (S803), whether or not the anomaly rate of the usage characteristic of server is less than the threshold is evaluated. The other steps in FIG. 8 and the display to the user after the evaluation are the same as embodiment 1.

Based on the foregoing evaluation, it is possible to display a notification upon determining the status by giving consideration to the influence that the access from the application program to the server, which was distributed to the individual servers, has on the operation performance of the respective servers.

In addition to the foregoing evaluation, this embodiment is additionally provided with the processing of performing evaluation by comparing the anomaly rate of the usage characteristic of the application program based on the total value of the distributed access with the anomaly rate of each operation performance of the individual servers. In other words, the anomaly rate of the total value of the usage characteristic of each server is calculated, in step (S801) of FIG. 8, from the total value of the usage characteristic of each server and the reference of each application program as the total value which is a consolidation of the distribution to the DB servers. Subsequently, in step (S803), whether or not the anomaly rate of the total value of the usage characteristic of each server is less than the threshold is evaluated. The other steps in FIG. 8 and the display to the user after the evaluation are the same as embodiment 1.

In the foregoing evaluation based on the comparison with the anomaly rate of the usage characteristic of each server, because it is not possible to know whether the load balancing ratio has changed or whether the usage characteristic of the application program itself has changed, by comparing the value obtained by totaling the values in application program units with the usage characteristic, it is possible to display a notification upon determining whether the usage characteristic of the application program is in a state that is different from normal.

Furthermore, when comparing the anomaly rate of the usage characteristic and the anomaly rate of the operation performance of the storage apparatus, because the storage apparatus is shared by the distributed servers, the anomaly rate of the evaluation is performed by using the total value the usage characteristic, and comparing the usage characteristic with the anomaly rate of each operation performance of the storage apparatus. In other words, in step (S801) of FIG. 8, the anomaly rate of the total value of the usage characteristic of each server is calculated from the total value of the user characteristic of each server and the reference of each application program as the total value which is a consolidation of the distribution to the DB servers. Subsequently, in step (S803), whether or not the anomaly rate of the total value of the usage characteristic of each server is less than the threshold is evaluated. The other steps in FIG. 8 and the display to the user after the evaluation are the same as embodiment 1.

Based on the foregoing evaluation, even when the operation performance of the storage apparatus is different from normal (anomaly rate is equal to or greater than the threshold), it is possible to display a proper notification upon determining whether or not the usage characteristic of the application program is different from normal. Moreover, in this embodiment, with regard to the determination processing (S405) on whether or not the recreation of the reference is required in the flowchart of FIG. 4, because whether or not the usage has changed is determined in application program units, the data of the anomaly rate calculated from the total value of each server is used as the usage characteristic data. In cases where the anomaly rate of the usage characteristic data of the total value is equal to or greater than the threshold, when a certain amount of data among the past data of a given period of time is equal to or greater than the threshold, it is determined that the recreation of the monitoring reference is required for the vectors of the usage characteristic and each operation performance.

According to the foregoing configuration, even in a system which adopts the load balancing processing configuration, it is possible to notify the proper evaluation of the status of resources by comparing the operation performance of the distributed resources and the data of the usage characteristic of the application program using those resources.

Third Embodiment

As a modified example of embodiment 1 of the present invention, illustrated is an embodiment of a configuration in which there are a plurality of pieces of software to be used in the resources of one device. While embodiment 1 included one device for monitoring the operational status, and used one vector to monitor the usage characteristic by the application program, this embodiment differs with respect to the point that there are a plurality of vectors of the usage characteristic relative to the operation performance of one device.

Figure 15:
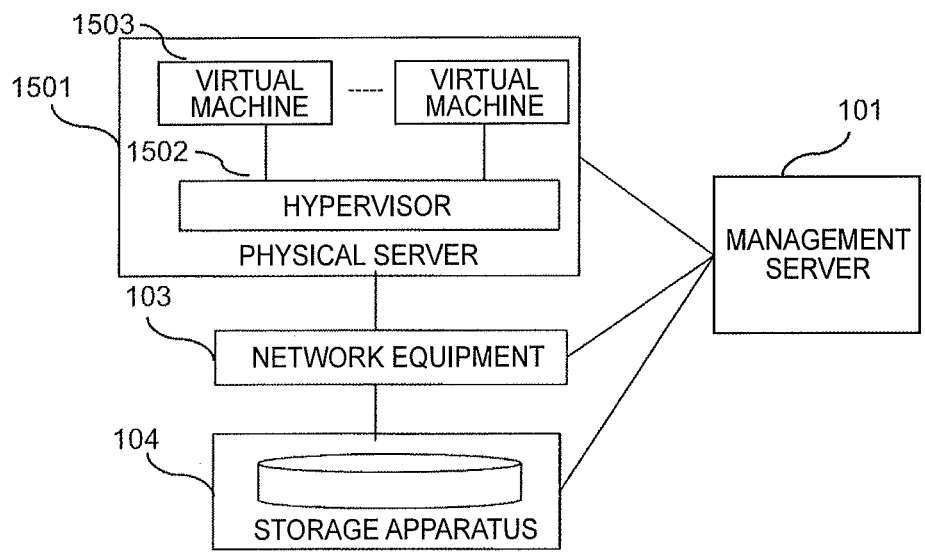
FIG. 15 is a diagram showing a concept of the system in embodiment 3 of the present invention.

Here, a server virtualized environment is taken as an example. FIG. 15 is a diagram showing an overview of the system to which embodiment 3 of the present invention is applied. In this configuration, the resources of one physical server 1501 are virtualized using a hypervisor 1502, which is virtualization platform software, and used by a plurality of virtual machines 1503. In a cloud environment, anticipated is the use of IaaS (Infrastructure as a Service) which provides a virtual machine to customers.

The physical server 1501 may also be directly connected to the storage apparatus 104 via the network equipment 103 as with FIG. 1. The management server 101 is connected to the respective devices as shown in FIG. 15 via a management network (not shown). While an application program and the like are running on the virtual machine 1503, here, the individual application programs will not be monitored, and information related to the use of resources of the physical server for each virtual machine is acquired as the information of the usage characteristic monitoring vector. The usage characteristic monitoring item management table of FIG. 6 targets the virtual machine, and manages the combination of the CPU usage rate and the memory usage rate as the monitoring items of the virtual machine.

As the operation performance information, information during operation is acquired from the device in the same manner as embodiment 1. Here, with the hypervisor of the physical server as the target, items related to the competition of resources are acquired as the information of the operation performance monitoring vector. For example, acquired is information such as the value indicating the ratio of the time in which the CPU could not schedule the execution of the virtual machine, and the swap usage of the memory. The operation performance monitoring item management table of FIG. 5 targets the hypervisor, and manages the combination of the foregoing items.

With regard to the measurement data, usage characteristic monitoring columns are provided for each virtual machine and managed in the monitoring data management table of FIG. 9. The operation performance monitoring columns are managed in hypervisor monitoring item columns.

In the flowchart of FIG. 4, the monitoring reference creation processing (S401) is the same as embodiment 1. A monitoring reference is created from the past measurement data with regard to the usage characteristic data of each virtual machine and the operation performance data of the hypervisor.

In the operational status diagnosis processing of FIG. 8, the anomaly rate is calculated for both the usage characteristic data of each virtual machine and the operation performance data of the hypervisor. With regard to the processing of comparing data and determining the status, in embodiment 1, the anomaly rate of one usage characteristic data of the same time period was compared with the anomaly rate of each operation performance data, but this embodiment differs in that a plurality of usage characteristic data of the same time period are compared with the anomaly rate of one operation performance data.

Figure 16:
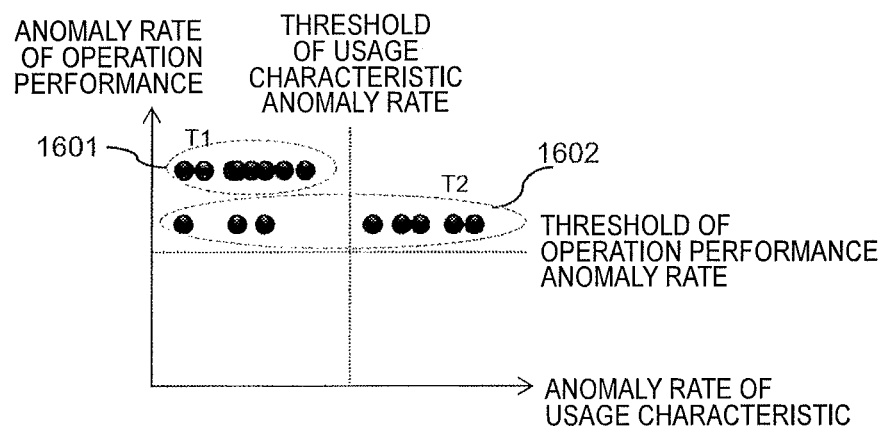
FIG. 16 is a diagram showing an example of the anomaly rate at a certain time in embodiment 3 of the present invention.

FIG. 16 is a diagram showing the scheme of evaluating data of a certain time in this embodiment. The anomaly rate of the operation performance data of the hypervisor is represented with the y-axis, and the anomaly rate of the usage characteristic data of each virtual machine is represented with the x-axis. The circles indicate the coordinates in which the respective anomaly rates of such certain time are represented as vectors. The anomaly rates of the operation performance data at the same time are the same, and FIG. 16 data 1601 at time T1 and data 1602 at time T2.

In the evaluation of this embodiment, when the operation performance data of the hypervisor is different from normal (anomaly rate is equal to or greater than the threshold) and the usage characteristic of all virtual machines is the same as normal (anomaly rate is less than the threshold) (1601), the hypervisor operational status is determined to be a warning status.

When the operation performance data of the hypervisor is different from normal (anomaly rate is equal to or greater than the threshold) and the usage characteristic of some of the virtual machines is different from normal (anomaly rate is equal to or greater than the threshold) (1602), the hypervisor operational status is determined to be a caution required status because this is the behavior of the hypervisor due to changes in the usage characteristic of such virtual machines. Here, the status may be determined to be a caution required status when the number of virtual machines in which the anomaly rate of the usage characteristic data is equal to or greater than the threshold is equal to or greater than a specific ratio relative to the overall number of virtual machines, or the status may be determined to be a caution required status even when there is only one virtual machine in which the anomaly rate is equal to or greater than the threshold. The conditions for determining the ratio of the virtual machines included in the range are defined in advance by the system or the administrator. In cases where the operation performance data of the hypervisor is less than the threshold, whether the status is normal or a caution (minimal risk) status is similarly evaluated based on the anomaly rate of the usage characteristic data of each virtual machine and the ratio of virtual machines included in each range.

With regard to the message to be notified, as with FIG. 12 of embodiment 1, the messages are managed based on each status with the hypervisor as the target, and notified according to the evaluation.

Note that, with regard to the notification, in addition to the method of displaying a notification when the determination result is different from normal at one point in time, a method of notifying the status including the most determination results, among the determination results of a given period of time, may also be adopted. For example, when the determination results from time T1 to time T10 are warning at T1 and caution required from T2 to T10, the caution required status is notified after the evaluation at T10.

Furthermore, in this embodiment, a notification is displayed by including the information of the virtual machines in the notification of the evaluated status. For example, when the determined status is warning, the anomaly rate of the usage characteristic data of each virtual machine is less than the threshold, and a message to the effect of "There is no virtual machine affecting the operation performance" is notified. When the determined status is caution required, because there are virtual machines in which the anomaly rate of the usage characteristic data is equal to or greater than the threshold, a message to the effect of "Virtual machines in which the usage characteristic has changed are VM1, VM2, and VM3" is notified.

The notifications to be displayed to the user are not limited to the notifications shown in FIG. 12, and, for example, the management computer may display the screen shown in FIG. 16, and the respective virtual machines such as VM1, VM2, and VM3 may be associated with the individual data on the screen shown in FIG. 16 and presented to the user. The user is thereby able to confirm the virtual machines that are affecting the operation performance as well as the anomaly rate of the usage characteristic thereof.

Moreover, in this embodiment, with regard to the determination processing (S405) on whether or not the recreation of the reference is required in the flowchart of FIG. 4, because there are a plurality of usage characteristic data of each virtual machine, it is determined that the recreation of the reference is required when the number of virtual machines in which the anomaly rate of the usage characteristic data is equal to or greater than the threshold becomes equal to or greater than a specific ratio defined in the system. The monitoring reference is created for both the usage characteristic data of each virtual machine and the operation performance data of the hypervisor.

According to the foregoing configuration, by comparing the operation performance of the hypervisor as the side providing the resources and the usage characteristic of each virtual machine providing the resources, it is possible to display a proper notification upon determining whether the problem lies with the resources of the hypervisor, or whether the virtual machines in which the usage characteristic has changed are the source of the influence. Moreover, the administrator can easily determine the virtual machine that is the source of the influence in cases where the hypervisor operation performance is different from normal.

Moreover, this embodiment is not limited to the configuration shown in FIG. 15, and can also be applied to cases where a plurality of user computers 100 exist in FIG. 1, and the server 102 is accessed from a plurality of application programs 106.

In the foregoing case, the value related to the access from the application programs 106 to the server 102 shown in FIG. 6 is managed for each of the plurality of application programs 106. Furthermore, the information to be acquired as the monitoring vector information by the usage characteristic is not the information of using the physical server for each virtual machine, and will be the value related to the access to the server 102 from each of the plurality of application programs 106.

The operation performance information is the same as embodiment 1, and, with regard to the measurement data, usage characteristic monitoring columns are provided for each application program (AP) 106 and managed in the monitoring data management table of FIG. 9.

In the flowchart of FIG. 4, the monitoring reference creation processing (S401) is the same as embodiment 1. A monitoring reference is created from the past measurement data with regard to the usage characteristic data of each application program 106 and the operation performance data of the monitoring items shown in FIG. 5.

In the operational status diagnosis processing of FIG. 8, the anomaly rate is calculated for both the usage characteristic data of each application program 106 and the operation performance data of the server 105 and the storage 104. With regard to the processing of comparing data and determining the status, similar to the configuration shown in FIG. 15, a plurality of usage characteristic data of the same time period are compared with the anomaly rate of one operation performance data.

FIG. 16 differs from the configuration of FIG. 15 with respect to the point that the anomaly rate of the operation performance data of the server 102 or the storage apparatus 104 is represented with the y-axis, and the anomaly rate of the usage characteristic data of each application program 106 is represented with the x-axis.

In the evaluation based on the configuration of FIG. 1, when the operation performance data of the server 102 or the storage apparatus 104 is different from normal (anomaly rate is equal to or greater than the threshold) and each of the plurality of usage characteristics are the same as normal (anomaly rate is less than the threshold) (1601), the operational status of the server 102 or the storage apparatus 104 is determined to be a warning status.

When the operation performance data of the server 102 or the storage apparatus 104 is different from normal (anomaly rate is equal to or greater than the threshold) and some of the usage characteristic data are different from normal (anomaly rate is equal to or greater than the threshold) (1602), the operational status of the server 102 or the storage apparatus 104 is determined to be a caution required status because this is the behavior of the server 102 or the storage apparatus 10 due to changes in the usage characteristic. Here, the status may be determined to be a caution required status when the number of application programs 106 in which the anomaly rate of the usage characteristic data is equal to or greater than the threshold is equal to or greater than a specific ratio relative to the overall number of application program 106, or the status may be determined to be a caution required status even when there is only one application program 106 in which the anomaly rate is equal to or greater than the threshold. The conditions for determining the ratio of the application programs 106 included in the range are defined in advance by the system or the administrator. In cases where the operation performance data of the hypervisor is less than the threshold, whether the status is normal or a caution (minimal risk) status is similarly evaluated based on the anomaly rate of the usage characteristic data of each application program 106 and the ratio of application programs 106 included in each range.

With regard to the message to be notified, the messages are managed based on each status with the server 102 or the storage apparatus 104 as the target, and notified according to the evaluation.

Note that, with regard to the notification, in addition to the method of displaying a notification when the determination result is different from normal at one point in time, a method of notifying the status including the most determination results, among the determination results of a given period of time, may also be adopted. For example, when the determination results from time T1 to time T10 are warning at T1 and caution required from T2 to T10, the caution required status is notified after the evaluation at T10.

Furthermore, in this embodiment based on the configuration of FIG. 1, a notification is displayed by including the information of the application program 106 in the notification of the evaluated status. For example, when the determined status is warning, the anomaly rate of the usage characteristic data of each application program 106 is less than the threshold, and a message to the effect of "There is no application program 106 affecting the operation performance" is notified. When the determined status is caution required, because there are application programs 106 in which the anomaly rate of the usage characteristic data is equal to or greater than the threshold, a message to the effect of "Application programs 106 in which the usage characteristic has changed are AP1, AP2, and AP3" is notified.

The notifications to be displayed to the user are not limited to the notifications shown in FIG. 12, and, for example, the management computer may display the screen shown in FIG. 16, and the respective application programs 106 such as AP1, AP2, and AP3 may be associated with the individual data on the screen shown in FIG. 16 and presented to the user. The user is thereby able to confirm the application programs 106 that are affecting the operation performance as well as the anomaly rate of the usage characteristic thereof.

Moreover, in this embodiment based on the configuration of FIG. 1, with regard to the determination processing (S405) on whether or not the recreation of the reference is required in the flowchart of FIG. 4, because there are a plurality of usage characteristic data of each application program 106, it is determined that the recreation of the reference is required when the number of application programs 106 in which the anomaly rate of the usage characteristic data is equal to or greater than the threshold becomes equal to or greater than a specific ratio defined in the system. The monitoring reference is created for both the usage characteristic data of each application program 106 and the operation performance data of the server 102 or the storage apparatus 104.

According to the foregoing configuration, by comparing the operation performance of the server 102 or the storage apparatus 104 as the side providing the resources and the usage characteristic as the value related to the access from each application program 106 to the server 102, it is possible to display a proper notification upon determining whether the problem lies with the resources of the server 102 or the storage apparatus 104, or whether the application programs 106 in which the usage characteristic has changed are the source of the influence. Moreover, the administrator can easily determine the application program 106 that is the source of the influence in cases where the operation performance is different from normal.

REFERENCE SIGNS LIST

100: User computer
101: Management server
102: Server
103: Network equipment
104: Storage apparatus
105: Execution platform software
106: Application program

The invention claimed is:

1. A management computer which manages a first computer to be managed which is accessed from a first application program, and includes a processor and a storage device,
wherein the storage device stores a reference value of an operation performance and a reference value of a usage characteristic,
wherein the processor:
acquires a first operation performance as a value related to a resource performance of the first computer to be managed and a first usage characteristic as a value related to access from the first application program to the first computer to be managed;
calculates an anomaly rate of the first operation performance and an anomaly rate of the first usage characteristic;

notifies an operational status of the first computer to be managed based on the calculated anomaly rate of the first operation performance and the calculated anomaly rate of the first usage characteristic;
    performs a first evaluation of comparing the anomaly rate of the first operation performance and a first threshold, and performs a second evaluation of comparing the anomaly rate of the first usage characteristic and a second threshold;
    notifies the operational status of the first computer to be managed based on results of the first evaluation and the second evaluation
    calculates a deviation level from the reference value of the operation performance of the acquired first operation performance as the anomaly rate of the first operation performance;
    calculates a deviation level from the reference value of the usage characteristic of the acquired first usage characteristic as the anomaly rate of the first usage characteristic;
    within a predetermined period, measures:
        a first frequency in a case where the anomaly rate of the first operation performance is equal to or greater than the first threshold in the first evaluation and the anomaly rate of the first usage characteristic is equal to or greater than the second threshold in the second evaluation,
        a second frequency in a case where the anomaly rate of the first operation performance is equal to or greater than the first threshold in the first evaluation and the anomaly rate of the first usage characteristic is less than the second threshold in the second evaluation,
        a third frequency in a case where the anomaly rate of the first operation performance is less than the first threshold in the first evaluation and the anomaly rate of the first usage characteristic is equal to or greater than the second threshold in the second evaluation, and
        a fourth frequency in a case where the anomaly rate of the first operation performance is less than the first threshold in the first evaluation and the anomaly rate of the first usage characteristic is less than the second threshold in the second evaluation;
    calculates a maximum frequency among the first frequency, the second frequency, the third frequency and the fourth frequency; and
    wherein the management computer:
        displays a different notification depending on which among the first frequency, the second frequency, the third frequency and the fourth frequency is maximum.

2. The management computer according to claim 1,
wherein the management computer:
    displays a first notification when the anomaly rate of the first operation performance is equal to or greater than the first threshold in the first evaluation; and
    displays a second notification when the anomaly rate of the first operation performance is equal to or greater than the first threshold in the first evaluation and the anomaly rate of the first usage characteristic is less than the second threshold in the second evaluation.

3. The management computer according to claim 1,
wherein the processor creates a reference value of an operation performance value from the acquired first operation performance value and creates a reference of a usage characteristic value from the acquired first usage characteristic value; and
wherein the storage device stores the created reference value of the operation performance value and the created reference value of the usage characteristic value.

4. The management computer according to claim 3,
wherein the processor recreates the reference value of the operation performance and the reference value of the usage characteristic when a ratio of the anomaly rate of the first usage characteristic exceeding the second threshold exceeds a predetermined value within a predetermined period; and
wherein the storage device stores the recreated reference value of the operation performance and the recreated reference value of the usage characteristic.

5. The management computer according to claim 1,
wherein the management computer further manages a second computer to be managed, and
wherein the processor:
    acquires a second operation performance as a value related to a resource performance of the second computer to be managed and a second usage characteristic as a value related to access from the first application program to the second computer to be managed;
    calculates an anomaly rate of the second operation performance and an anomaly rate of the second usage characteristic;
    calculates a total usage characteristic as a total of the first usage characteristic and the second usage characteristic;
    calculates an anomaly rate of the total usage characteristic; and
    notifies an operational status of the first computer to be managed and the second computer to be managed based on the calculated anomaly rate of the first operation performance, the calculated anomaly rate of the first usage characteristic, the anomaly rate of the second operation performance, the anomaly rate of the second usage characteristic, and the calculated total usage characteristic.

6. The management computer according to claim 1,
wherein the management computer is further accessed from a second application program, and
wherein the processor further:
    acquires a third usage characteristic as a value related to access from the second application program to a second computer to be managed;
    calculates an anomaly rate of the third usage characteristic; and
    notifies an operational status of the first computer to be managed based on the calculated anomaly rate of the first operation performance, the calculated anomaly rate of the first usage characteristic, and the calculated anomaly rate of the third usage characteristic.

7. A method of managing a first computer to be managed which is accessed from a first application program,
wherein the first computer further includes a storage device,
wherein the storage device stores a reference value of an operation performance and a reference value of a usage characteristic, and
wherein the method includes the steps of:
    acquiring a first operation performance as a value related to a resource performance of the first computer to be managed and a first usage characteristic as a value related to access from the first application program to the first computer to be managed;

calculating an anomaly rate of the first operation performance and an anomaly rate of the first usage characteristic;
notifying an operational status of the first computer to be managed based on the calculated anomaly rate of the first operation performance and the calculated anomaly rate of the first usage characteristic,
performing a first evaluation of comparing the anomaly rate of the first operation performance and a first threshold;
performing a second evaluation of comparing the anomaly rate of the first usage characteristic and a second threshold;
notifying the operational status of the first computer to be managed based on results of the first evaluation and the second evaluation;
calculating a deviation level from the reference value of the operation performance of the acquired first operation performance as the anomaly rate of the first operation performance; and
calculating a deviation level from the reference value of the usage characteristic of the acquired first usage characteristic as the anomaly rate of the first usage characteristic;
measuring, within a predetermined period:
  a first frequency in a case where the anomaly rate of the first operation performance is equal to or greater than the first threshold in the first evaluation and the anomaly rate of the first usage characteristic is equal to or greater than the second threshold in the second evaluation,
  a second frequency in a case where the anomaly rate of the first operation performance is equal to or greater than the first threshold in the first evaluation and the anomaly rate of the first usage characteristic is less than the second threshold in the second evaluation,
  a third frequency in a case where the anomaly rate of the first operation performance is less than the first threshold in the first evaluation and the anomaly rate of the first usage characteristic is equal to or greater than the second threshold in the second evaluation, and
  a fourth frequency in a case where the anomaly rate of the first operation performance is less than the first threshold in the first evaluation and the anomaly rate of the first usage characteristic is less than the second threshold in the second evaluation;
calculating a maximum frequency among the first frequency, the second frequency, the third frequency and the fourth frequency; and
displaying a different notification depending on which among the first frequency, the second frequency, the third frequency and the fourth frequency is maximum.

8. The method of managing a computer to be managed according to claim 7,
wherein the method further includes the steps of:
displaying a first notification when the anomaly rate of the first operation performance is equal to or greater than the first threshold in the first evaluation; and
displaying a second notification when the anomaly rate of the first operation performance is equal to or greater than the first threshold in the first evaluation and the anomaly rate of the first usage characteristic is less than the second threshold in the second evaluation.

9. The method of managing a computer to be managed according to claim 7,
wherein the method further includes the steps of:
creating a reference value of an operation performance value from the acquired first operation performance value;
creating a reference of a usage characteristic value from the acquired first usage characteristic value; and
storing the created reference value of the operation performance value and the created reference value of the usage characteristic value.

10. The method of managing a computer to be managed according to claim 9,
wherein the method further includes the steps of:
recreating the reference value of the operation performance and the reference value of the usage characteristic when a ratio of the anomaly rate of the first usage characteristic exceeding the second threshold exceeds a predetermined value within a predetermined period; and
storing the recreated reference value of the operation performance and the recreated reference value of the usage characteristic.

11. The method of managing a computer to be managed according to claim 7,
wherein the management computer further manages a second computer to be managed, and
wherein the method further includes the steps of:
acquiring a second operation performance as a value related to a resource performance of the second computer to be managed and a second usage characteristic as a value related to access from the first application program to the second computer to be managed;
calculating an anomaly rate of the second operation performance and an anomaly rate of the second usage characteristic;
calculating a total usage characteristic as a total of the first usage characteristic and the second usage characteristic;
calculating an anomaly rate of the total usage characteristic; and
notifying an operational status of the first computer to be managed and the second computer to be managed based on the calculated anomaly rate of the first operation performance, the calculated anomaly rate of the first usage characteristic, the anomaly rate of the second operation performance, the anomaly rate of the second usage characteristic, and the calculated total usage characteristic.

12. The method of managing a computer to be managed according to claim 7, wherein the management computer is further accessed from a second application program, and
wherein the method further includes the steps of:
acquiring a third usage characteristic as a value related to access from the second application program to a second computer to be managed;
calculating an anomaly rate of the third usage characteristic; and
notifying an operational status of the first computer to be managed based on the calculated anomaly rate of the first operation performance, the calculated anomaly rate of the first usage characteristic, and the calculated anomaly rate of the third usage characteristic.

* * * * *